(12) United States Patent
Boneberg et al.

(10) Patent No.: US 6,510,892 B2
(45) Date of Patent: Jan. 28, 2003

(54) LAYERED-TYPE OF HEAT EXCHANGER AND USE THEREOF

(75) Inventors: Stefan Boneberg, Beuren (DE); Bruno Motzet, Weilheim/Teck (DE); Alois Tischler, Aidenbach (DE); Marc Weisser, Owen/T. (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/810,343

(22) Filed: Mar. 19, 2001

(65) Prior Publication Data

US 2001/0030041 A1 Oct. 18, 2001

(30) Foreign Application Priority Data

Mar. 17, 2000 (DE) .......................................... 100 13 439

(51) Int. Cl.[7] ................................................. F28F 27/02
(52) U.S. Cl. ....................... 165/100; 165/101; 165/166; 165/905
(58) Field of Search ............................. 165/100, 101, 165/140, 166, 167, 282, 296

(56) References Cited

U.S. PATENT DOCUMENTS

| | | | |
|---|---|---|---|
| 2,623,736 A | * 12/1952 | Hytte | ........................ 165/100 |
| 3,150,028 A | * 9/1964 | Wennerberg | ................ 159/17.2 |
| 3,513,907 A | * 5/1970 | Hughes | ....................... 165/166 |
| 3,587,731 A | * 6/1971 | Hays | ........................... 165/140 |
| 4,050,506 A | * 9/1977 | Small | .......................... 165/295 |
| 4,696,341 A | * 9/1987 | Bolmstedt et al. | .......... 165/101 |
| 4,721,164 A | * 1/1988 | Woodward | ................... 165/101 |
| 5,974,817 A | * 11/1999 | Prummer | ..................... 101/487 |

FOREIGN PATENT DOCUMENTS

| | | |
|---|---|---|
| DE | 44 26 692 | 9/1995 |
| EP | 0 861 802 | 9/1998 |

* cited by examiner

*Primary Examiner*—Allen Flanigan
(74) *Attorney, Agent, or Firm*—Crowell & Moring LLP

(57) ABSTRACT

A heat exchanger has a plurality of fluidically parallel first layers which define first heat exchanger ducts through which a first medium is capable of flowing, and in each case has a second layer between the two first layers. The respective second layer is in thermal contact with the two adjacent first layers and defines at least one second heat exchanger duct through which a second medium is capable of flowing in parallel. The respective second layer comprises two fluidically parallel layer plies. A controllable supply of the second medium to the one and/or the other layer ply in each case is provided. Such a heat exchanger can be used, in particular, as an evaporator with an integrated starting and main evaporator part, and particularly as an evaporator in a reforming plant of a fuel-cell vehicle.

11 Claims, 2 Drawing Sheets

LAYERED-TYPE OF HEAT EXCHANGER AND USE THEREOF

BACKGROUND AND SUMMARY OF THE INVENTION

The invention relates to a heat exchanger of the layered-type and an advantageous use thereof, and more particularly, to a layered-type heat exchanger having a plurality of fluidically parallel first layers which define first heat exchanger ducts through which a first medium is capable of flowing, and in each case a second layer between the two first layers, the respective second layer being in thermal contact with the two adjacent first layers and defining at least one second heat exchanger duct through which a second medium is capable of flowing. Such a heat exchanger can be employed, for example, as an evaporator in a reforming plant, in which a hydrocarbon or hydrocarbon derivative is steam reformed for the purpose of generating a hydrogen-rich gas. The hydrogen-rich gas can then serve, for example, for feeding fuel cells in a fuel-cell vehicle.

Various versions of such heat exchangers of the layered or plate-type are known. This type of heat exchanger typically has a construction consisting of plates, discs or films stacked one above the other, with the result that essentially plane layers are formed. An alternative construction consists of tubes lying one in the other, with the result that layers resembling cylindrical rings are formed.

For specific applications, multi-stage heat exchangers are required, in which two or more stages are fluidically arranged in series or in parallel with respect to one and/or the other medium, particularly also for an evaporator in a reforming plant. Thus, the German Patent document DE 44 26 692 C1 describes a two-stage evaporator for evaporating a reactant mass flow with the aid of a heat transfer medium, in which the two evaporator stages are fluidically connected in series with respect to the reactant mass flow and with respect to the heat transfer medium. In this case, each stage may, in turn, consist of two evaporator parts which are fluidically connected in parallel with respect to the reactant mass flow and/or to the heat transfer medium. In particular, this is used for the purpose of evaporating water and methanol in parallel evaporator parts, and for subsequently combining the two components to form the reactant mass flow. The evaporator has a construction consisting of films with, alternately, ducts for the heat transfer medium and ducts for the reactant mass flow. The two evaporators can be integrated into this construction in that, in a group of the two alternating film layers, the first stage is formed by a first duct which is directly connected to an inflow and the second stage is formed by ducts which emanate from the first duct which thereby constitutes a distributor duct.

The laid-open European publication EP 0 861 802 A2 discloses a reforming unit with an integrated evaporator of the layered type, in which the evaporator comprises an actual evaporation layer and a steam-superheating layer located fluidically downstream with respect to the medium to be evaporated. Heat, which is generated by a catalytic combustion operation, can be supplied to the two evaporator layers from adjacent heating layers.

The rapid cold-starting behavior customary in other motor vehicles is required for fuel-cell vehicles, thus necessitating a correspondingly rapid cold-starting behavior of the evaporator if a steam reforming plant is used for hydrogen generation. If, for this purpose, a small light-weight starting evaporator and a main evaporator are fluidically connected in series with respect to the medium to be evaporated, this results in an additional pressure loss through the starting evaporator and makes temperature regulation under normal operation more difficult. In an alternative solution the batch steam to be reformed is generated in a one-part evaporator and, depending on the operating situation, that is to say cold starting or normal operation, can be conducted through a steam valve in controlled fractions into a first and/or second reformer stage. This solution has the problem that, during cold starting, steam condenses on the initially cold valve and a comparatively complicated valve is necessary because of the extreme ambient conditions due to the hot batch steam.

The technical problem on which the invention is based is, therefore, to provide a heat exchanger of the above-mentioned type and an advantageous use thereof, which allows a different thermal control of the one medium controllably through a first or a second heat exchanger part or in controllable fractions in parallel in both respective heat exchanger parts.

The invention solves this problem by providing a layer-type heat exchanger having a plurality of fluidically parallel first layers which define first heat exchanger ducts through which a first medium is capable of flowing, and in each case a second layer between the two first layers, the respective second layer being in thermal contact with the two adjacent first layers and defining at least one second heat exchanger duct through which a second medium is capable of flowing. The respective second layer comprises two fluidically parallel layer plies, each of which defines an associated second heat exchanger duct. Means are provided for the controllable supply of the second medium to the one layer ply in each case and/or to the other layer ply in each case. This type of heat exchanger is used as an evaporator in a reforming plant for the evaporation of a batch to be reformed. The one layer plies form a starting evaporator part and the other layer plies form a main evaporator part.

In the heat exchanger according to the invention, which has a construction consisting of alternating layers through which flows a first or a second medium, the respective second layer is divided into two fluidically parallel layer plies. The respective two layer plies of the second layers are assigned means for supplying the corresponding second medium in each case to one layer ply and/or in each case to the other layer ply in controllable fractions. By means of the two layer plies, the respective medium can be thermally controlled differently in a desired manner and/or also divided in any desired way.

When this heat exchanger is used as an evaporator in a reforming plant, the batch to be reformed can be evaporated correspondingly in controllable fractions in one evaporator part or the other. This is done in order, for example, to supply two different reformer stages independently with the vaporous educt and/or to design one of the two evaporator parts, integrated into the layered construction, specially for the cold-starting situation, that is to say for low inertia and therefore rapid cold-starting evaporation, whereas the other evaporator part is designed for normal operation in the warmed-up state.

The layered construction according to the invention has the further advantage that the two layer plies of every second layer can be brought into thermal contact with a first medium in parallel, not in series. When the heat exchanger is used as an evaporator in the reforming plant, in such a way that the one layer plies of the second layer function as a main evaporator in normal warmed-up operation and the other layer plies function as a starting evaporator particularly for the cold-starting situation, the main evaporator can be heated directly by the first medium, without the latter first being conducted via the starting evaporator.

In a heat exchanger according to a preferred embodiment, different heat transmission capacities are provided for the respective two layer plies, for example by means of effective heat transmission surfaces of different size. When the heat exchanger is used as an evaporator, the one layer plies can thus be designed specially for the cold-starting situation and the other layer plies specially for warmed-up operation.

In a heat exchanger according to a preferred embodiment, the supply means for the second medium contain a control valve, by which the second medium can be apportioned in controllable fractions into the two fluidically parallel layer-ply groups. In an evaporator application, this has the particular advantage that the control valve is arranged on the liquid side of the second medium to be evaporated, not on the steam side, and therefore does not have to be designed for high steam temperatures. This also does away with the problem which impedes rapid cold starting, namely that of condensation of evaporated medium on a still cold steam-side valve.

Other objects, advantages and novel features of the present invention will become apparent from the following detailed description of the invention when considered in conjunction with the accompanying drawings.

DETAILED DESCRIPTION OF THE DRAWINGS

Figure 1:
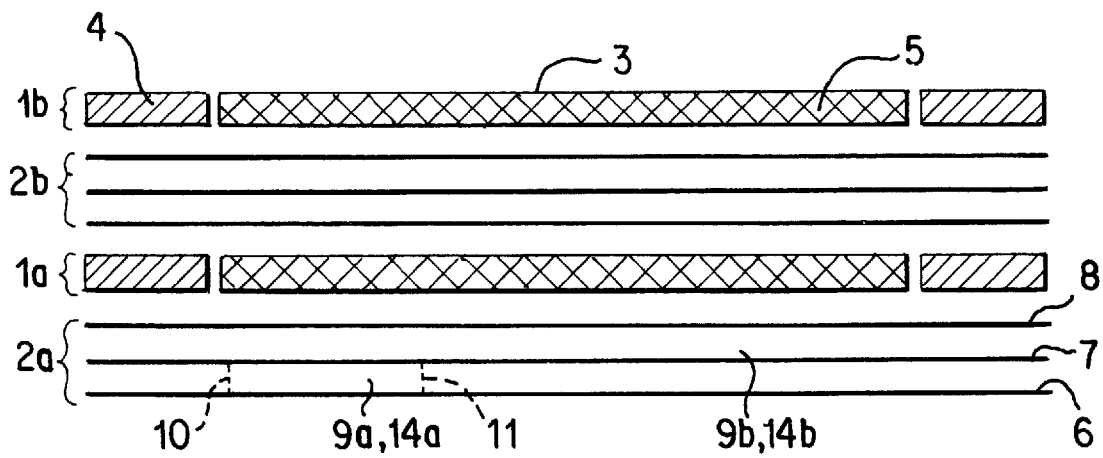
FIG. 1 is a diagrammatic cross-sectional exploded view of the layered stack construction of a heat exchange according to the invention which can be used, for example, as an evaporator.

FIG. 1 shows in a diagrammatic cross-sectional exploded view for the sake of clearer illustration two layers 1a, 1b, 2a, 2b of a layered stack construction (consisting of any desired predeterminable number of alternately successive first layers 1a, 1b, . . . and second layers 2a, 2b, . . . ) of a heat exchanger of the layered type. The first layers 1a, 1b contain in each case a lamella 3 as a component active in heat transmission, also called a heat-conducting rib, and a frame 4 surrounding the lamella 3 and defining first heat exchanger ducts 5 through which the first medium is capable of flowing. The lamella 3 may consist, for example, of a heat-conducting corrugated rib structure which may be formed as a single ply or as multiple plies, for example, from corrugated rib plies stacked crosswise one above the other (so-called cross-duct structures).

Figure 2:
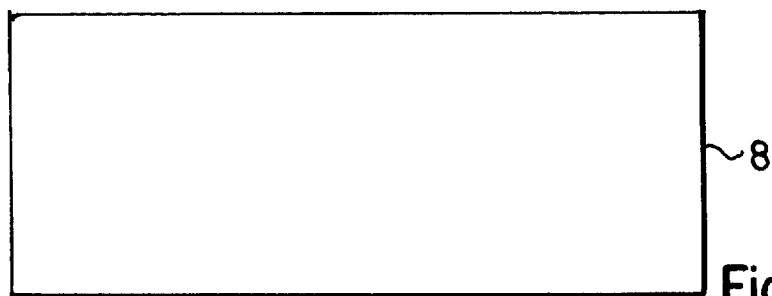
FIGS. 2 to 4 are top views of the various layers through which one of the two media to be brought into thermal contact is capable of flowing in the heat exchanger layered construction of FIG. 1 for forming a plurality of layer plies.
Figure 3:
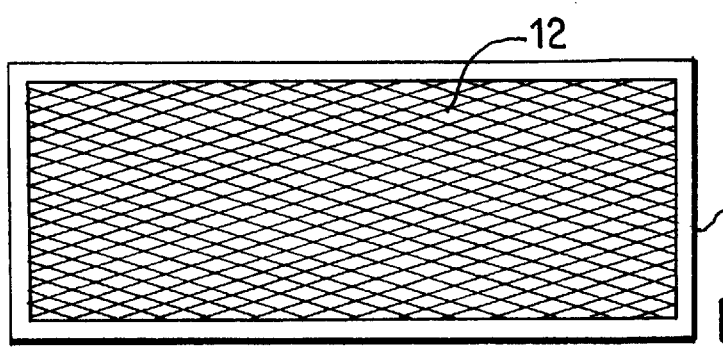
Figure 4:
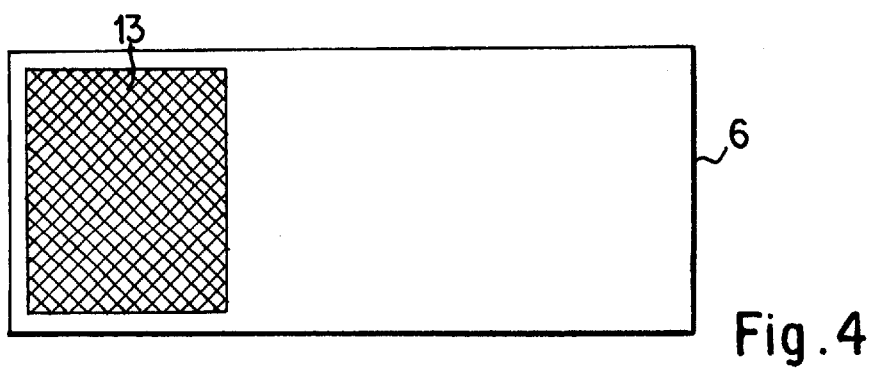
Figure 5:
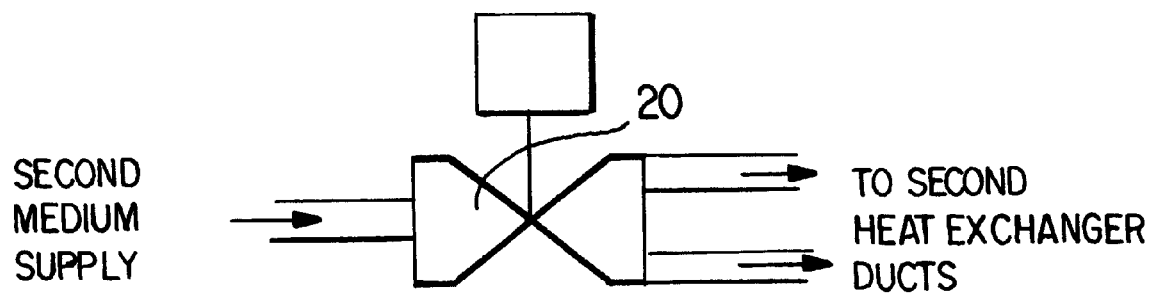
FIG. 5 schematically illustrates a control valve for supplying a second medium to second heat exchanger ducts.

Located in each case between the two first layers 1a, 1b is a respective second layer 2a, 2b through which a second medium is capable of flowing. The second layer includes a sequence of three metallic plate or film elements 6, 7, 8, which are stacked one on the other and are each diagrammatically shown individually in a top view in FIGS. 2 to 4. It is clear from these Figures that, in this example, according to FIG. 2 the film 8 of the second layers 2a, 2b, which is the upper layer in FIG. 1, has no structuring on the side shown, whereas, according to FIG. 3, the middle film 7 is provided on the respective side with structuring 12 over the entire area, whilst, according to FIG. 4, the lower film 6 is structured, on the side shown, only on part 13 of its surface, for example on one third of the latter. In a preferred embodiment, the film 6 may also be structured over the entire area or, in a further preferred embodiment, even be identical to the film 8. All three films 6, 7, 8 of this exemplary embodiment are unstructured on their other side (not shown in FIGS. 2 to 4). In so far as there is structuring of the films 6, 7, 8, second heat exchanger ducts are thereby defined, through which the second medium is capable of flowing and which are in thermal contact with the first heat exchanger ducts 5 of the first layers 1a, 1b. In so far as unstructured surfaces are located opposite one another in the layered construction of FIG. 1, these adjoin one another in a gas-tight manner in the ready-assembled layered construction.

As a result of the composite stack structure of the respective three metal films 6, 7, 8, it follows that two layer plies 9a, 9b are formed. Each forms a second heat exchanger duct 14a, 14b for the throughflow of the second medium and together form the respective second layer 2a, 2b. In this case, the one second heat exchanger duct 14a of every second layer 2a, 2b is separated fluidically from the other second heat exchanger duct 14b via the middle film 7. More than two layer plies 9a, 9b may also be provided. According to the partial structuring of the metal film 6 of FIG. 4, the one second heat exchanger duct 14a extends only over the corresponding part-region of the associated layer ply 9a, as symbolized diagrammatically in FIG. 1 by broken lines 10, 11. By contrast, the other second heat exchanger duct 14b extends, according to the structuring of the film 7 of FIG. 3, over the entire area over which the lamellae 3 also extend. The second medium constitutes, for example, the heating medium of the secondary side of the heat exchanger, the first medium being heated on the cold primary side by the heating medium.

By using appropriate connecting structures, which are of a conventional type and therefore are not explained in detail here, care is taken to ensure that the first medium can be fed in parallel into the heat exchanger ducts 5 of the first layers 1a, 1b and discharged again from these. A second medium can be fed in parallel and in controllable fractions into the one, the other, or both heat exchanger ducts 14a, 14b of the two layer plies 9a, 9b of the second layers 2a, 2b arranged alternately to the first layers 1a, 1b and, after flowing through these two layer plies, be discharged from them again.

The heat exchanger shown is suitable for example, for use as an evaporator in a reforming plant with two-stage reforming. In this case, the first layers 1a, 1b serve as heating layers. A correspondingly hot medium is conducted through them. Or, these layers are designed as active heat-generating layers, for example as catalytic burner layers. The second layers 2a, 2b (consisting in each case of the two parallel layer plies 9a, 9b) serve as evaporator layers, to which the batch to be reformed, for example a mixture of water and a hydrocarbon or hydrocarbon derivative or else water or other liquid educts, is supplied for the purpose of evaporation. Advantageously, in this case, the one layer plies 9a, which contain the heat exchanger ducts 14a defined by the only partially structured film 6, together form a starting evaporator. The other layer plies 9b having the structuring together form a main evaporator. The main evaporator is fluidically connected in parallel to the starting evaporator both with respect to the heating side and with respect to the evaporation side and is integrated together with said starting evaporator into the common layered construction.

This consequently produces a 3-way evaporator with separate inlets and outlets for the batch to be evaporated, for independently supplying two downstream reformer stages with the vaporous educt. For the controllable supply of the batch either entirely to the starting evaporator part, entirely to the main evaporator part or in adjustable fractions partly to the starting evaporator part and partly to the main evaporator part, an activatable valve with two outlets is provided, in a way not shown, in a batch supply line. A line branch extends in each case from these two outlets to the inlet side of the starting evaporator part or of the main evaporator part. Since, in contrast to a steam-side valve, this valve is located in a region with markedly lower temperatures, a comparatively light-weight and cost-effective liquid valve is sufficient for this purpose.

The further advantage of dispensing with a steam-side valve is that, particularly in a cold-starting situation, only a slight thermal mass to be heated by the steam is located between the evaporator and the following reformer, to be precise only the mass of the associated connecting line. During the first cold-starting phase, therefore, markedly less steam condenses than when a steam-side valve is used.

During a cold start, the batch is then first fed only into the starting evaporator part 9a. Since the latter extends only over part of the stack cross-sectional area, it can be heated up relatively quickly and is therefore capable, even after only a short time, of delivering steam. Moreover, guiding the heating medium in countercurrent to the batch to be evaporated is conducive to a rapid cold start. It should be noted that the respective layer ply 9a of the starting evaporator part is not only in thermal contact, on one side, directly via the partially structured film 6, with the one adjacent (lamellar) heating layer, but also, via the heat-conducting contact of the middle film 7 and of the unstructured film 8, with the other of the two adjacent heating layers 1a, 1b.

When a sufficient operating temperature is reached, the main evaporator part is then activated in that the entire batch to be evaporated or, in all events, a large part of the latter is supplied to it. The starting evaporator part 9a is then deactivated or continues to be operated only with a low load. The starting evaporator part integrated together with a main evaporator part into a common layered construction advantageously functions, by virtue of its additional mass, directly as a thermal buffer of the main evaporator part when the plant is operating dynamically.

By connecting in parallel the starting evaporator part and the main evaporator part, the heating-side pressure loss and the construction volume can be reduced, as compared with two evaporator parts connected in series. Moreover, because of lower thermal stresses during operation, the useful life of the evaporator can be improved. This is true since, during cold starting, these stresses occur only in the starting evaporator part and therefore in a region subjected to low load in normal operation, whilst the main evaporator regions subjected to high stress in normal operation can be designed to a suitably high standard, without thereby slowing the cold-starting behavior.

As compared with the starting evaporator part and the main evaporator part being arranged in series on the heating side, the direct parallel heatability of the main evaporator part and starting evaporator part, for example by means of catalytic burner layers, improves the regulatability of the evaporator when regulation takes place via the inlet temperature of the heating medium.

It goes without saying that the heat exchanger according to the invention is also suitable for other intended uses, in which one medium is to be thermally controlled by another medium and, at the same time, is to be conducted controllably through the one, through the other or proportionately through both of two fluidically parallel heat exchanger parts. It also goes without saying that the invention also embraces, in addition to the layered construction shown, heat exchangers of the layered type produced in a different way, for example with different structuring of the plate, disc or film elements used, in order to fix the corresponding heat exchanger layers, or with a layered construction in the form of cylindrical tubes and consisting of heat-conducting tubular elements lying one in the other. The heat exchanger ducts may be formed, instead of by the structuring of individual plate or film elements, also by spaced unstructured plate elements with an interposed spacer structure, in particular a heat-conducting corrugated rib structure. It is essential, in each case, merely that the one or several second layers for a second medium, which are located in each case between two adjacent first layers for a first medium, be divided into at least two fluidically parallel layer plies to which the second medium can be allocated controllably.

In a further beneficial development, two different media, which are heated by a third medium, are evaporated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A layered heat exchanger, comprising:
    a plurality of fluidically parallel first layers defining first heat exchanger ducts adapted to flow therethrough a first medium;
    a second layer arranged, in each case, between two of said plurality of fluidically parallel first layers, said second layer being in thermal contact with the two adjacent first layers and defining at least one second heat exchanger duct adapted to flow therethrough a second medium;
    wherein each respective second layer comprises two fluidically parallel layer plies, each defining an associated second heat exchanger duct; and
    means for controllably varying the relative proportion of the second medium supplied to said two fluidically parallel layer plies.

2. The heat exchanger according to claim 1, wherein said two fluidically parallel layer plies are adapted for different heat transmission capacities.

3. The heat exchanger according to claim 1, wherein said supplying means for the second medium includes a control valve which transfers an incoming flow of the second medium in controllable fractions to an inlet side of said two fluidically parallel layer plies.

4. The heat exchanger according to claim 2, wherein said supplying means for the second medium includes a control valve which transfers an incoming flow of the second medium in controllable fractions to an inlet side of at least one of said two fluidically parallel layer plies.

5. The heat exchanger according to claim 1, wherein said heat exchanger is used as an evaporator in a reforming plant for evaporating a batch to be reformed, one of said two fluidically parallel layer plies forming a starting evaporator part and the other of said two fluidically parallel layer plies forming a main evaporator part.

6. The heat exchanger according to claim 2, wherein said heat exchanger is used as an evaporator in a reforming plant for evaporating a batch to be reformed, one of said two fluidically parallel layer plies forming a starting evaporator part and the other of said two fluidically parallel layer plies forming a main evaporator part.

7. The heat exchanger according to claim 3, wherein said heat exchanger is used as an evaporator in a reforming plant for evaporating a batch to be reformed, one of said two fluidically parallel layer plies forming a starting evaporator part and the other of said two fluidically parallel layer plies forming a main evaporator part.

8. A layered heat exchanger, comprising:
- a plurality of fluidically parallel first layers defining first heat exchanger ducts adapted to flow therethrough a first medium;
- a second layer arranged, in each case, between two of said plurality of fluidically parallel first layers, said second layer being in thermal contact with the two adjacent first layers and defining at least one second heat exchanger duct adapted to flow therethrough a second medium;
- wherein each respective second layer comprises two fluidically parallel layer plies, each defining an associated second heat exchanger duct; and
- wherein the relative proportion of the second medium supplied to said two fluidically parallel layer plies is variably controlled.

9. An evaporator for use in a reforming plant to evaporate a batch to be reformed, comprising:
- a plurality of fluidically parallel first heat layers defining first heat exchanger ducts adapted to flow therethrough a hot medium;
- a second evaporator layer arranged, in each case, between two of the plurality of fluidically parallel first heat layers, the second evaporator layer being in thermal contact with the two adjacent first heat layers and defining at least one second heat exchanger duct adapted to flow therethrough the batch to be reformed;
- wherein each respective second evaporator layer comprises two fluidically parallel evaporator layer plies, one defining a starting evaporator and another defining a main evaporator, the starting and main evaporator being adapted to different heat transmission capacities; and
- means for controllably varying the relative proportion of the batch supplied to the starting and main evaporators.

10. The evaporator according to claim 9, wherein the controllable supply means is arranged upstream on a liquid side of the batch to be reformed.

11. The evaporator according to claim 10, wherein the controllable supply means comprises a control valve which transfers an incoming flow of the batch to be reformed in controllable fractions to an inlet side of at least one of the starting and main evaporators.

* * * * *